(12) United States Patent
Park (10) Patent No.: US 8,402,692 B1
(45) Date of Patent: Mar. 26, 2013

(54) INVERTIBLE PLANT POT (76) Inventor: Hong Ku Park, Huntsville, AL (US)

( * ) Notice: Subject to any disclaimer, the term of this patent is extended or adjusted under 35 U.S.C. 154(b) by 0 days.

(21) Appl. No.: 12/882,827

(22) Filed: Sep. 15, 2010

Related U.S. Application Data

(60) Provisional application No. 61/242,525, filed on Sep. 15, 2009.

(51) Int. Cl.
*A01G 9/02* (2006.01)
(52) U.S. Cl. ............................................................ 47/67
(58) Field of Classification Search .................. 47/65.5, 47/65.6, 67
See application file for complete search history.

(56) References Cited

U.S. PATENT DOCUMENTS

| 6,094,861 | A | 8/2000 | Sandman et al. |
| 6,298,600 | B1 * | 10/2001 | Feldman ............................ 47/67 |
| 6,874,278 | B2 * | 4/2005 | Felknor et al. .................... 47/67 |
| 7,669,366 | B2 * | 3/2010 | Felknor ........................... 47/65.8 |
| 7,845,112 | B2 * | 12/2010 | Felknor ........................... 47/65.8 |

* cited by examiner

*Primary Examiner* — Kristen C Hayes
(74) *Attorney, Agent, or Firm* — Angela Holt; Bradley Arant Boult Cummings LLP (57) ABSTRACT

A plant pot for growing plants in an inverted orientation is provided. The plant pot comprises a soil chamber for retaining soil, and an open end for filling the soil chamber. An end cover releasably couples to the open end to retain the soil. A base end opposes the open end and comprises an aperture through which a plant is planted. An aperture cover releasably couples to the aperture and comprises an adjustable opening. The adjustable opening encircles the stem of the plant and enlarges as the stem grows.

2 Claims, 15 Drawing Sheets

INVERTIBLE PLANT POT

REFERENCE TO RELATED APPLICATIONS

This application claims priority to Provisional Patent Application U.S. Ser. No. 61/242,525, entitled "Invertible Plant Pot" and filed on Sep. 15, 2009, which is fully incorporated herein by reference.

BACKGROUND

The present invention relates generally to an apparatus for growing plants, and more particularly to an apparatus for growing plants in the inverted position. Even more particularly, the present invention relates to an apparatus allowing for the plant to first be grown in the upright position, then being inverted once root stability has been established.

Inverted gardening is a method of growing plants in the upside down position by planting them in pots and hanging the pots in the inverted position. The inverted gardening method is used to assist plant growth and health by facilitating circulation and avoiding disease. The method involves planting a plant in an invertible pot and hanging the pot in the inverted position, allowing room for the plant to suspend above the ground.

SUMMARY

An apparatus according to an embodiment of the present disclosure comprises an invertible plant pot and a cover which attaches to the top of the invertible plant pot. The plant pot comprises a walls and a floor which form a soil chamber for planting a plant. A hook extends from a wall to allow the invertible plant pot to be hung therefrom. Within the soil chamber is an inner platform extending vertically from the floor and comprising a base and a plant aperture for the plant to extend from the soil chamber, through the floor, and to the outside of the plant pot. An adjustable cover is coupled to the inner platform adjacent to the plant aperture to allow for the size of the plant aperture to be adjusted.

Once a sufficient amount of soil is placed within the soil chamber, the cover is secured to the plant pot and the plant pot is placed in the upright position. The plant is then planted in the soil within the plant aperture to allow the plant to grow through the plant aperture. After a sufficient amount of time has passed to allow for the plant roots to develop, the plant pot is inverted and suspended from the hook.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

These and other embodiments of the present invention will also become readily apparent to those skilled in the art from the following detailed description of the embodiments having reference to the attached figures, the invention not being limited to any particular embodiment(s) disclosed.

Repeat use of reference characters throughout the present specification and appended drawings is intended to represent the same or analogous features or elements of the invention.

DETAILED DESCRIPTION

Figure 1:
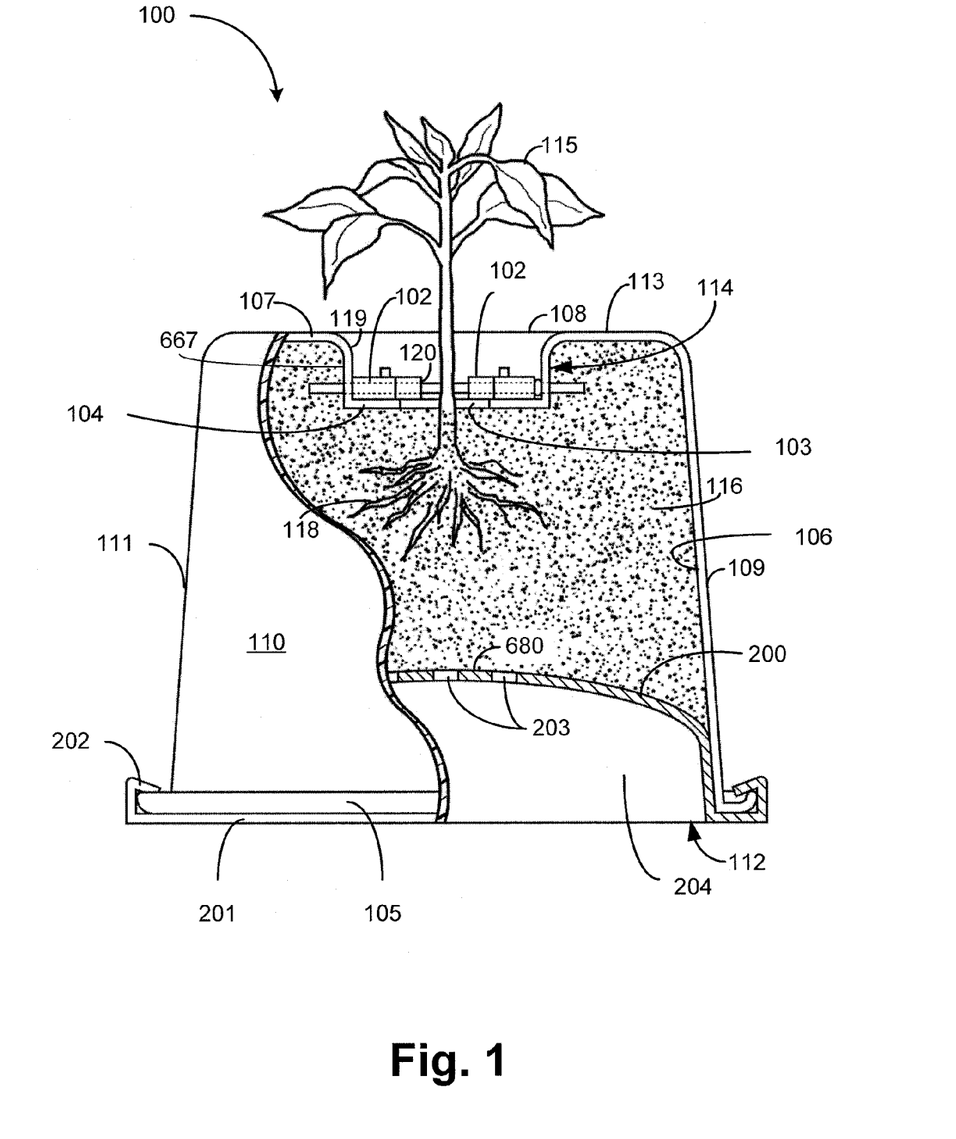
FIG. 1 is a cut-away perspective of an invertible plant pot according to an exemplary embodiment of the present disclosure in the upright position prior to inversion.

FIG. 1 depicts a cut-away perspective of an invertible plant pot 100 in the upright position prior to inversion with a plant 115 growing therefrom. The invertible plant pot 100 comprises a soil chamber 106 that is filled with soil 116. The soil chamber 106 comprises an open end 112 and a base end 113. The plant 115 has roots 118 that root in the soil 116 that is contained within the soil chamber 106. The plant 115 grows from the soil 116 extending from a plant aperture 103 in the base end 113.

Note that in one embodiment the soil chamber 106 is generally cubical and is formed by walls 108-111 and a floor 107 of the base end 113. Further note that the soil chamber 106, while shown as substantially cubical, can be other shapes in other embodiments. For example, the soil chamber 106 may be cylindrical.

The invertible plant pot 100 further comprises a cover 200. The cover 200 is coupled to the open end 112 of the plant pot 100. The cover 200 comprises a rim 201 and one or more cover fasteners 202. In addition, the cover 200 comprises a trough 204 that extends into the soil chamber 106. As will be described further herein, the trough 204 comprises one or more drainage holes 203 that are located near the apex 680 of the trough 204. The drainage holes 203 allow excess water to drain from the soil 116 that is within the soil chamber 106 when the invertible plant pot 100 is in the upright position. The drainage holes 203 further allow water to enter the soil chamber 106 when the invertible plant pot is in the inverted position.

The invertible plant pot 100 further comprises a pot rim 105, and the cover 200 comprises the cover rim 201. The cover 200 fits over the open end 112 of the invertible plant pot 100. In this regard, the cover rim 201 is abutted against the pot rim 105 and is held in place by one or more cover fasteners 202 that extend around and grasp the pot rim 105.

As indicated hereinabove, the invertible plant pot 100 is shown in an "upright position." Note that the "upright position" as used herein refers to that position of the invertible plant pot 100 when the cover 200 of the invertible plant pot 100 rests on a surface (not shown) and the open end 112 is covered by the cover 200 and is inaccessible.

The invertible plant pot 100 further comprises a platform 114. The platform 114 extends downward into the soil chamber 106 when the plant pot 100 is in the upright position. The platform 114 comprises a platform floor 104, which is a recessed shelf in the illustrated embodiment. The platform floor 104 and comprises a plant aperture 103 through which the plant 115 extends.

The platform 114 further comprises a platform wall 119 that extends between the floor 107 and the platform floor 104. In the illustrated embodiment, the floor 107 is generally flat and the platform wall 119 curvedly extends from the floor 107 to generally cylindrical sidewalls 667 that comprise the platform wall 119. The adjustable cover 102 is releasably coupled to the platform 114 and covers the aperture 103, as further discussed herein. In the illustrated embodiment the adjustable cover 102 is generally disc shaped (i.e., circular).

The adjustable cover 102 has a plant aperture 120 in its middle. Thus, a plant 115 that is planted in the soil 116 of the soil chamber 106 extends from the soil chamber 106, through the aperture 103 of the platform floor 104, through the aperture 120 of the adjustable cover 102, and out from the floor 107 of the base end 113 to the outside of the invertible plant pot 100.

Figure 2:
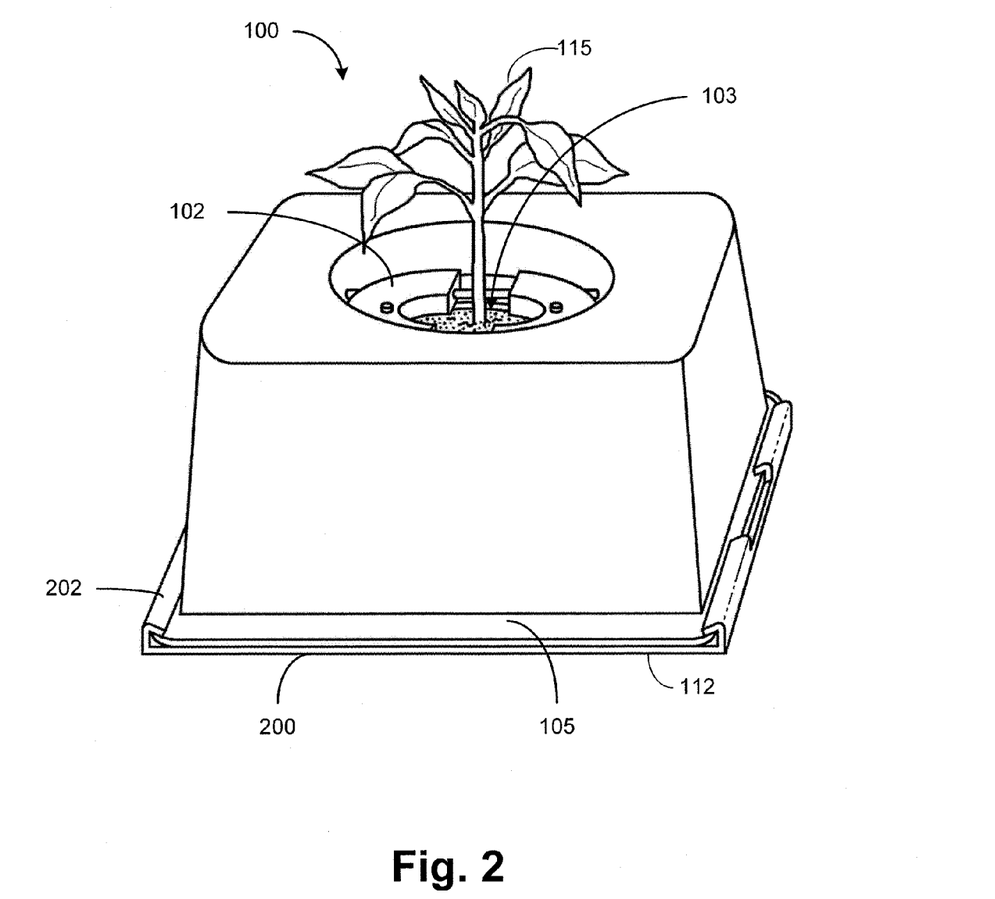
FIG. 2 is a perspective view of the invertible plant pot of FIG. 1 in an upright position prior to inversion.

FIG. 2 depicts a perspective view of the invertible plant pot 100 in the upright position with a plant 115 growing therefrom. When the invertible plant pot 100 is in the upright position the cover 200 rests on a surface (not shown), and the plant aperture 103 is positioned at the top of the plant pot 100 to allow the plant 115 to begin growing therefrom. When the plant 115 grows in the pot 100 in the upright position, its roots 118 (FIG. 1) grow downward and outward into the soil 116 (FIG. 1) in a traditional manner.

As described hereinabove with respect to FIG. 1, the cover 200 is coupled to the open end 112 of the invertible plant pot 100. In this regard, the cover fasteners 202 couple the cover 200 to the pot rim 105.

The adjustable cover 102 is coupled to the platform 114 (FIG. 1). The adjustable cover 102 comprises the opening 120 that can be adjusted thereby limiting the diameter of the aperture 103. Thus, when the invertible plant pot 100 is in the upright position, the adjustable cover 102 is in an open position. However, when the invertible plant pot 100 is inverted, i.e., turned upside down, the adjustable cover 102 can be placed in a closed position before the plant pot 100 is inverted to minimize loss of soil and to support the plant roots. Note that FIG. 2 shows the adjustable cover 102 in the open position.

Figure 3:
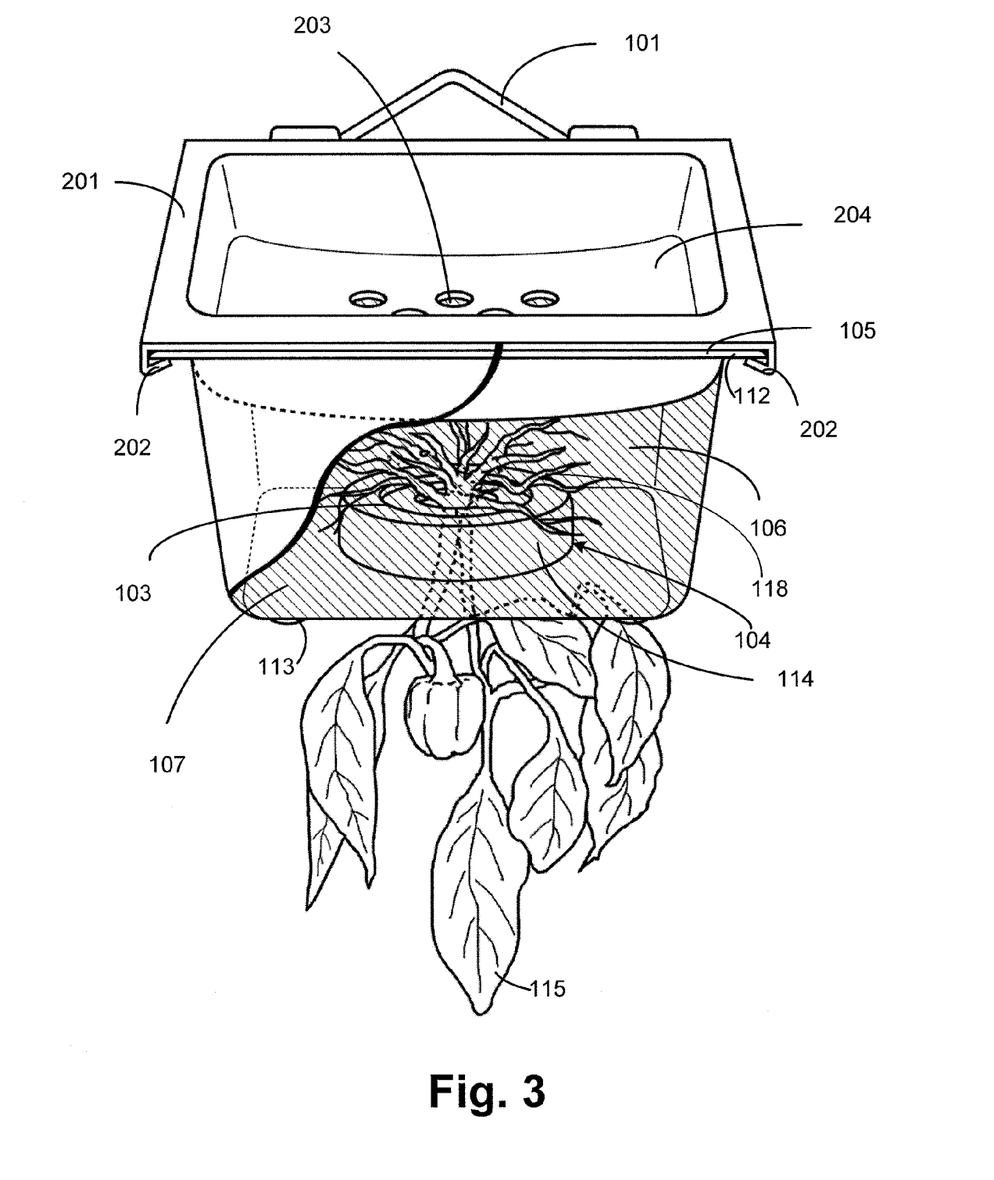
FIG. 3 is a cut-away perspective view of the invertible plant pot of FIG. 1 in the inverted position.

FIG. 3 depicts the invertible plant pot 100 in the inverted position with a plant 115 growing downwardly therefrom. The cover 200 is coupled to the open end 112 of the invertible plant pot 100 and is secured to the open end 112 of the plant pot 100 by the cover fasteners 202 grasping the pot rim 105, as described hereinabove.

The trough 204 extends downward into the soil chamber 106 and the drainage holes 203 are located at the lowest point of the trough 204 when the plant pot 100 is in the inverted position. The platform 114 extends from the pot floor 107 and comprises the platform floor 104 and the plant aperture 103. The plant aperture 103 provides access for the plant 115 to pass through and hang below the base end 113 of the invertible plant pot 100 when the plant pot 100 is in its inverted position, keeping the roots 118 within the soil chamber 106.

In addition, the invertible plant pot 100 comprises an inversion hook 101. The inversion hook 101 can be placed on a nail, for example, so that the invertible plant pot 100 hangs in the inverted position and the plant 115 can grow downwardly from the invertible plant pot 100.

Figure 4:
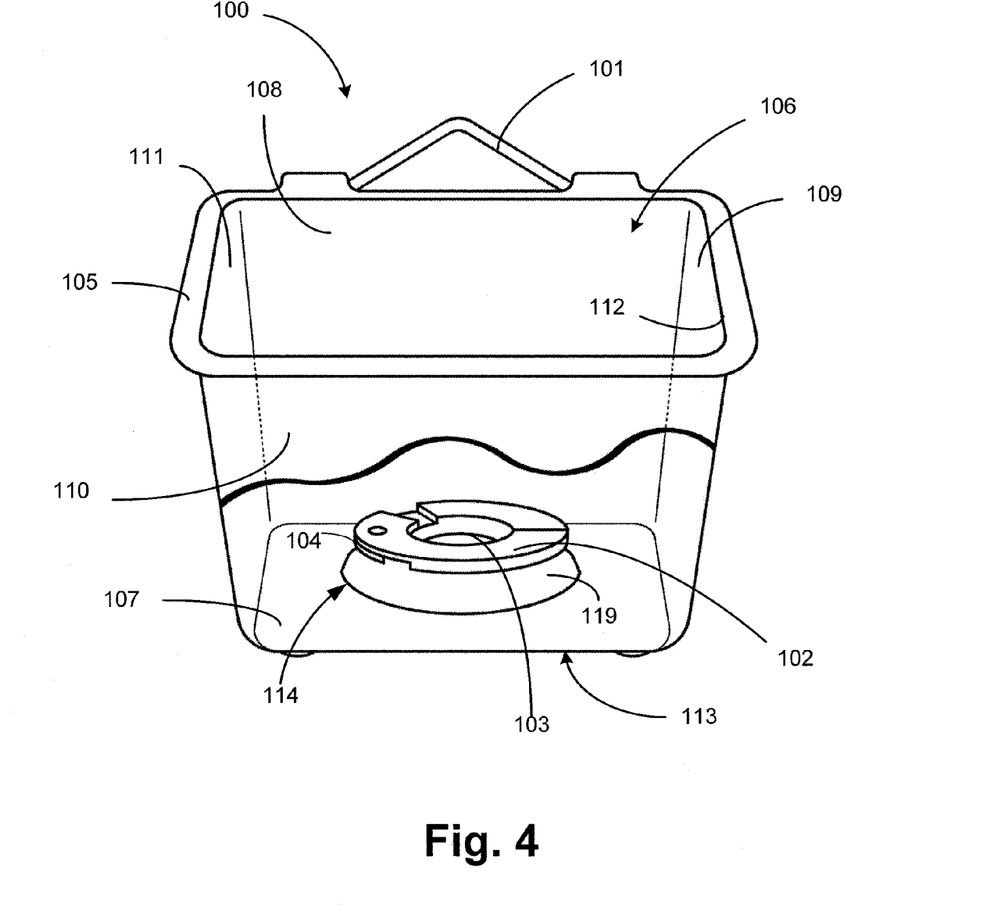
FIG. 4 is a perspective view of the invertible plant pot of FIG. 1 with no plant installed.

FIG. 4 depicts the invertible plant pot 100 in the inverted position without the soil 116 (FIG. 1) or plant 115 (FIG. 1). The invertible plant pot 100 comprises the walls 108-111 and the floor 107 which form a generally cubical soil chamber 106. The platform 114 extends from the floor 107 within the soil chamber 106. The platform 114 comprises the platform wall 119, the platform floor 104, the plant aperture 103, and the adjustable cover 102.

The plant aperture 103 allows the plant 115 (FIG. 1) to extend from the soil chamber 106, through the floor 107, and to the outside of the invertible plant pot 100. The adjustable cover 102 can be used to vary the size of the plant aperture 103. The adjustable cover 102 has multiple embodiments set forth in the figures below.

The invertible plant pot 100 further comprises the pot rim 105 extending outwardly from the walls 108-111 at the open end 112 of the plant pot 100. In one embodiment, the inversion hook 101 extends from the pot rim 105 adjacent to the wall 108. Such an inversion hook 101 is used to hang the invertible plant pot 100 in its inverted position.

Figure 5:
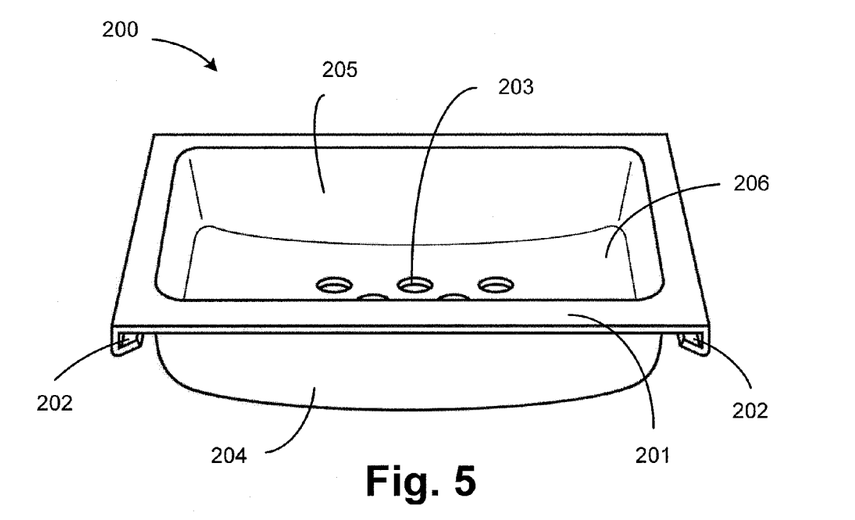
FIG. 5 is a top perspective view of a cover used to cover the plant pot of FIG. 1.

FIG. 5 depicts a top perspective view of one embodiment of the cover 200 that couples to the open end 112 (FIG. 1) of the invertible plant pot 100 (FIG. 1). The cover 200 comprises a cover rim 201 that extends around the upper edge of a trough 204. Extending from the cover rim 201 are cover fasteners 202. In this embodiment, the cover fasteners 202 are substantially U-shaped such that the fasteners 202 can slidably couple to the pot rim 105 (FIG. 1). Notably, the cover 200 may be coupled to the open end 112 of the invertible plant pot 100 in a variety of ways, and the fasters slidably coupling to the pot rim 105 is an exemplary way in which the cover 200 can be coupled to the pot rim 105.

The concave inner surface 205 of the trough 204 extends downwardly from the cover rim 201. In one embodiment, the trough comprises drainage holes 203 that are located on the bottom surface 206 of the trough 204.

Figure 6:
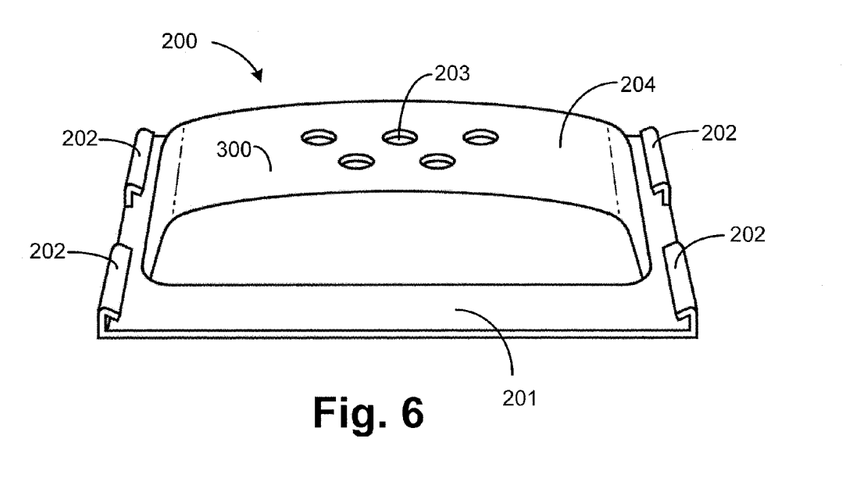
FIG. 6 is a bottom perspective view of the cover of FIG. 5.

FIG. 6 depicts a bottom perspective view of the cover 200. Notably, the cover rim 201 of the cover 200 comprises the four U-shaped cover fasteners 202 extending from the cover rim 201. Note that four (4) cover fasteners 202 are shown for exemplary purposes. Additional or fewer cover fasteners 202 may be used in other embodiments. In one embodiment, for example, the cover fasteners 202 may extend the entire width of the cover 200.

As noted hereinabove, the convex outer surface 300 of the trough 204 extends from the cover rim 201. In the surface 300 of the trough 204, the drainage holes 203 are positioned such that when the plant pot 100 is in the upright position water can flow out of soil 116 (FIG. 1) in the soil chamber 106 (FIG. 1).

Figure 7:
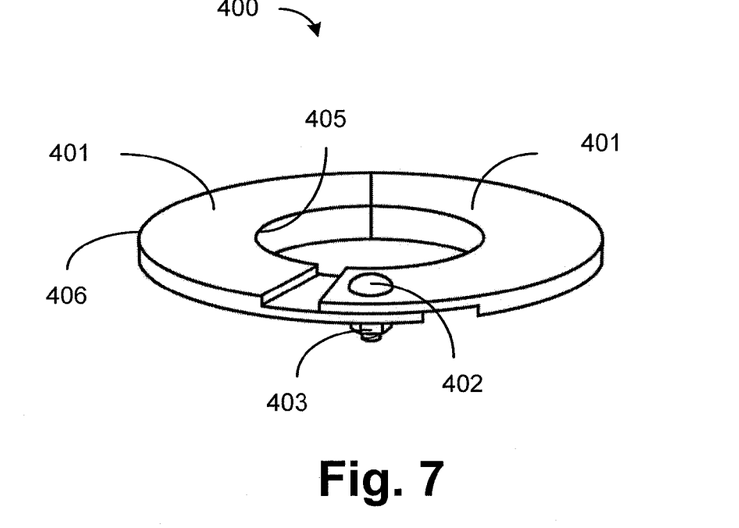
FIG. 7 is a top perspective view of an adjustable cover according to an exemplary embodiment of the present disclosure.

FIG. 7 depicts a perspective view of the top of an adjustable cover 400 in accordance with an embodiment of the present disclosure that can be used in the invertible plant pot 100 (FIG. 1) to control the size of the plant aperture 103 (FIG. 1) of the platform 114. The adjustable cover 400 comprises first and second pivoting members 401 coupled together with a screw 402 and a nut 403. The first and second pivoting members 401 have an inner perimeter 405 and an outer perimeter 406, with the inner perimeter 405 capable of becoming smaller or larger upon adjustment of the first and second pivoting members 401.

Figure 8:
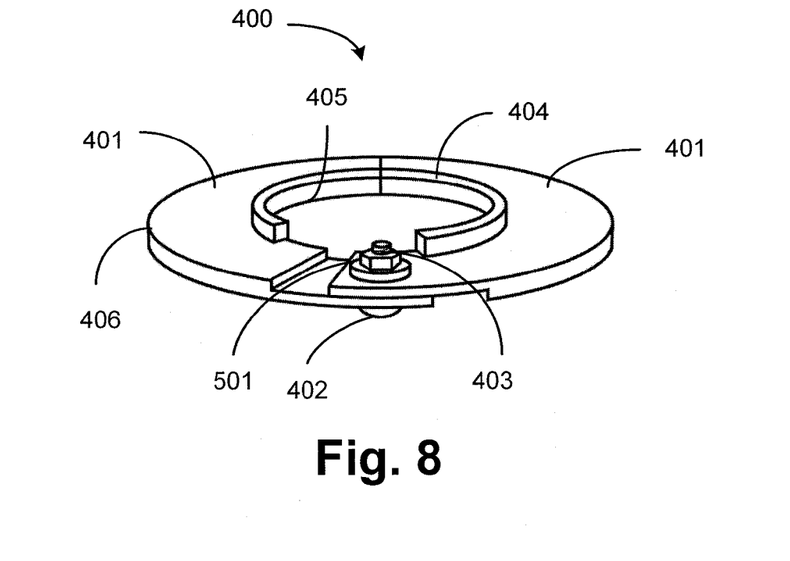
FIG. 8 is a bottom perspective view of the adjustable cover in FIG. 7.

FIG. 8 depicts a perspective view of the bottom of the adjustable cover 400, further depicting a washer 501 located between the nut 403 and the bottom surface of the pivoting member 401. A lip 404 extends from the bottom surface along the inner perimeter 405 of the pivoting members 401.

Figure 9:
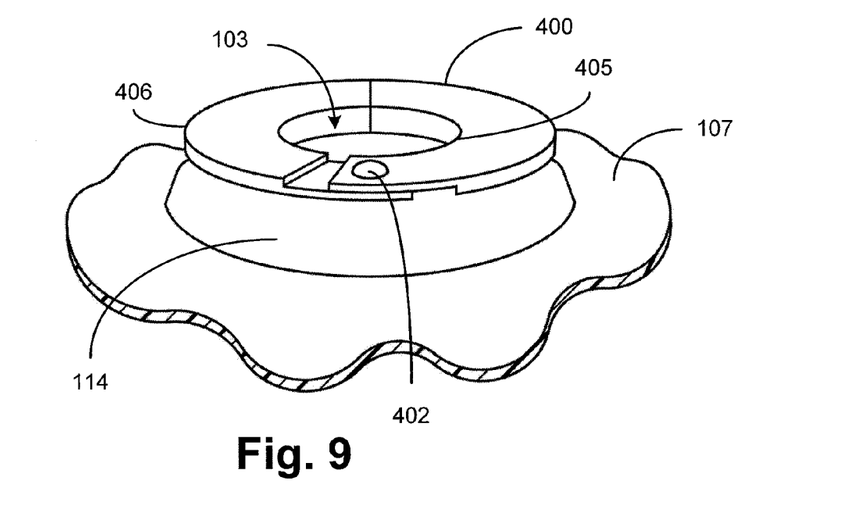
FIG. 9 is a perspective view of the adjustable cover of FIGS. 7 and 8 coupled to an inner platform of an invertible plant pot.

FIG. 9 depicts a perspective view of the adjustable cover 400 coupled to the platform 114 of the invertible plant pot 100. The adjustable cover 400 is aligned with the plant aperture 103 and the screw 402 is tightened when the adjustable cover's inner perimeter 405 is the desired circumference. The platform 114 keeps the adjustable cover 400 elevated above the floor 107 of the invertible plant pot 100.

Figure 10:
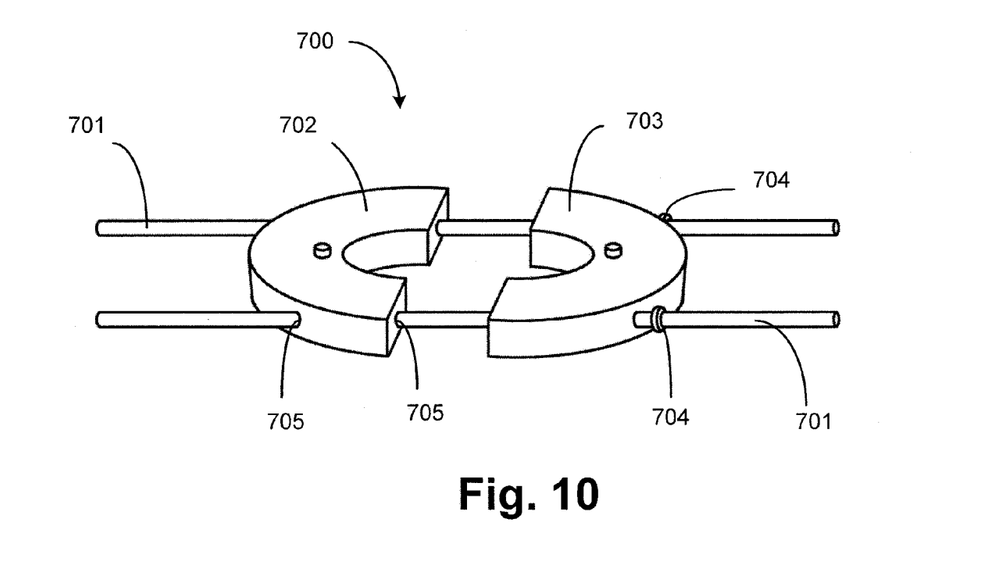
FIG. 10 is a perspective view of a closure used in connection with the plant pot of FIG. 1.

FIG. 10 depicts a perspective view of another exemplary adjustable cover 700 in accordance with another embodiment of the present disclosure. In such an embodiment, the adjustable cover 700 comprises a first and second arc member 702 and 703. The first and second arc members 702 and 703 are slidably connected using closure rods 701 positioned through aligned rod channels 705 in the arc members 702 and 703. Braces 704 are positioned on the closure rods 701 behind the second arc member 703 in order to keep the second arc member 703 in place.

Figure 11:
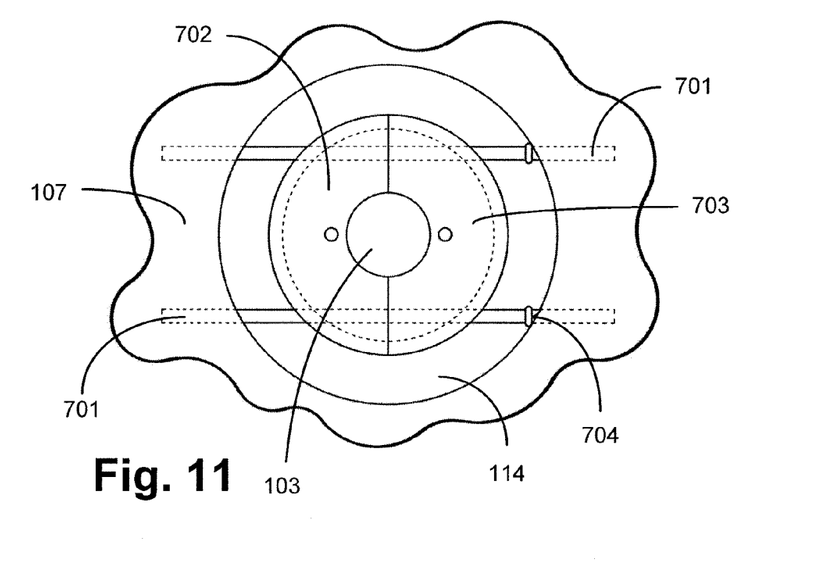
FIG. 11 is a top view of the closure in FIG. 10 in a closed position showing the closure coupled to the inner platform of the invertible plant pot of FIG. 1.
Figure 12:
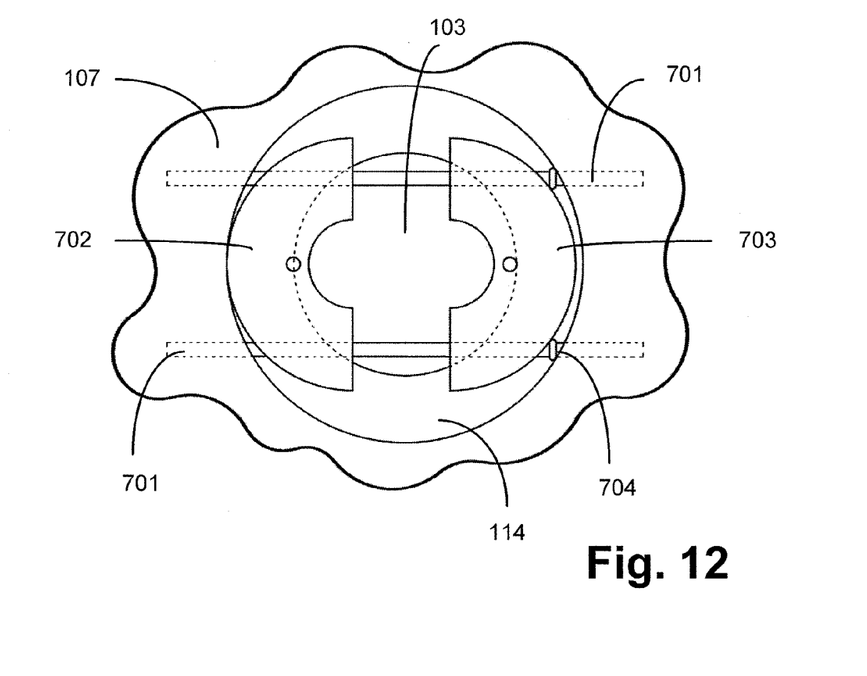
FIG. 12 is a top view of the closure in an open position coupled to the inner platform of the invertible plant pot of FIG. 1.

FIG. 11 and FIG. 12 depict bottom views of the adjustable cover 700 in the closed and open positions, respectively. In this regard, the adjustable cover 700 is coupled to the platform 114 of an invertible plant pot 100. The first and second arc members 702, 703 are positioned within the platform 114 on the outer surface of the invertible plant pot 100 aligned with the bottom of the plant aperture 103. The closure rods 701 extend horizontally from the soil chamber 106 through one side of the platform 114, through the first and second arc members 702 and 703, through a second side of the platform 114 and reenter the soil chamber 106. The braces 704 are attached to the closure rods 701 and abut the outer surface of the plant pot 100 within the platform 114.

Figure 13:
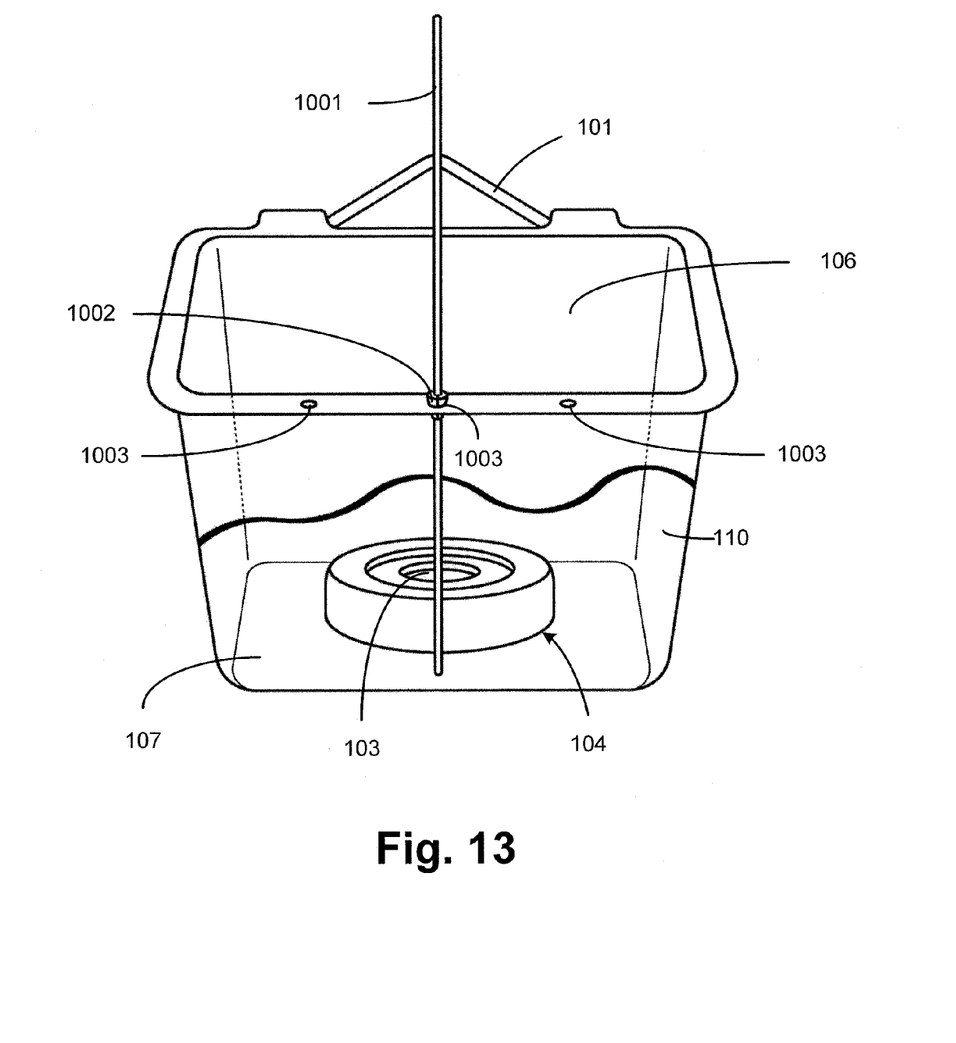
FIG. 13 is a front perspective view of an exemplary invertible plant pot of FIG. 1 with a support rod.

FIG. 13 depicts a perspective view of the invertible plant pot 100 with a support rod 1001 and slots 1003. The support rod 1001 extends vertically through a slot 1003 in the pot rim 105 adjacent to the wall 110 of the invertible plant pot 100. A clip 1002 is used to fix the support rod 1001 to the pot rim 105. Remaining slots 1003 may be used in conjunction with wires (not shown) to support weak vines or vines overloaded with fruits and vegetables. Other configurations for supporting the plant are also achievable without departing from the scope of the invention.

Figure 14:
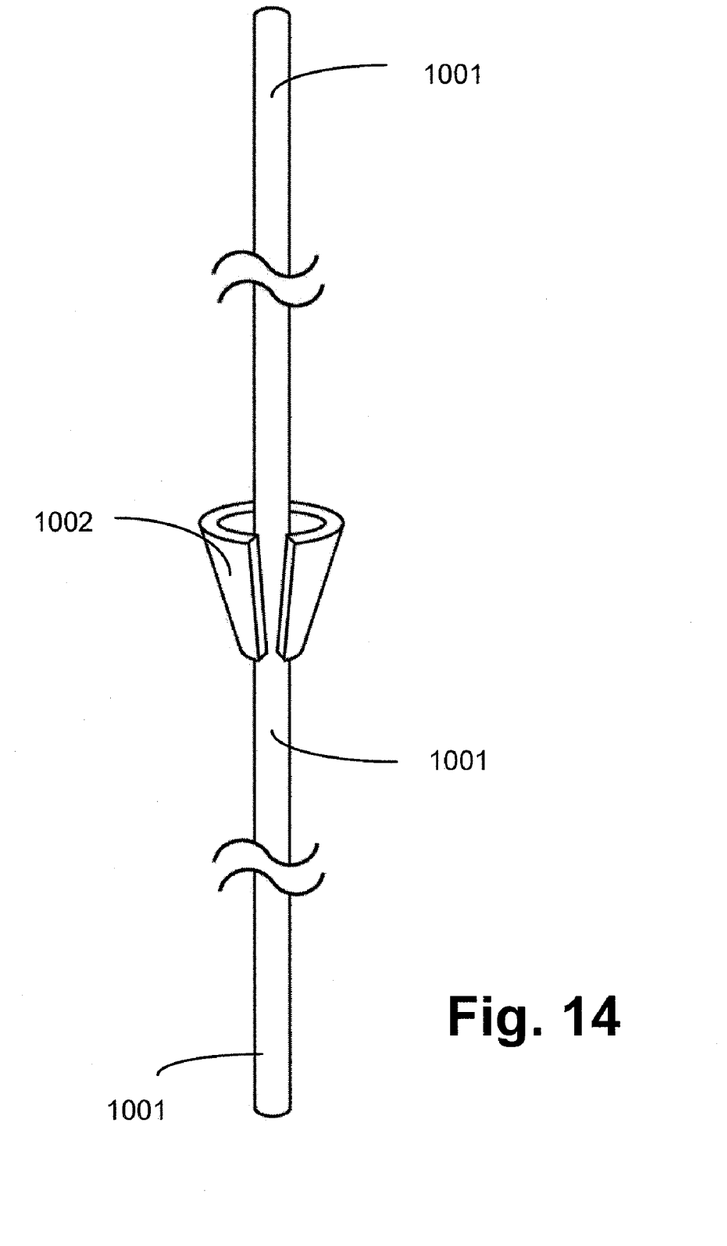
FIG. 14 is a front view of the support rod of FIG. 13 having a clip.

FIG. 14 depicts a front view of the support rod 1001. The clip 1002 surrounds the support rod 1001 and the support rod 1001 extends vertically and downward therefrom.

Figure 15:
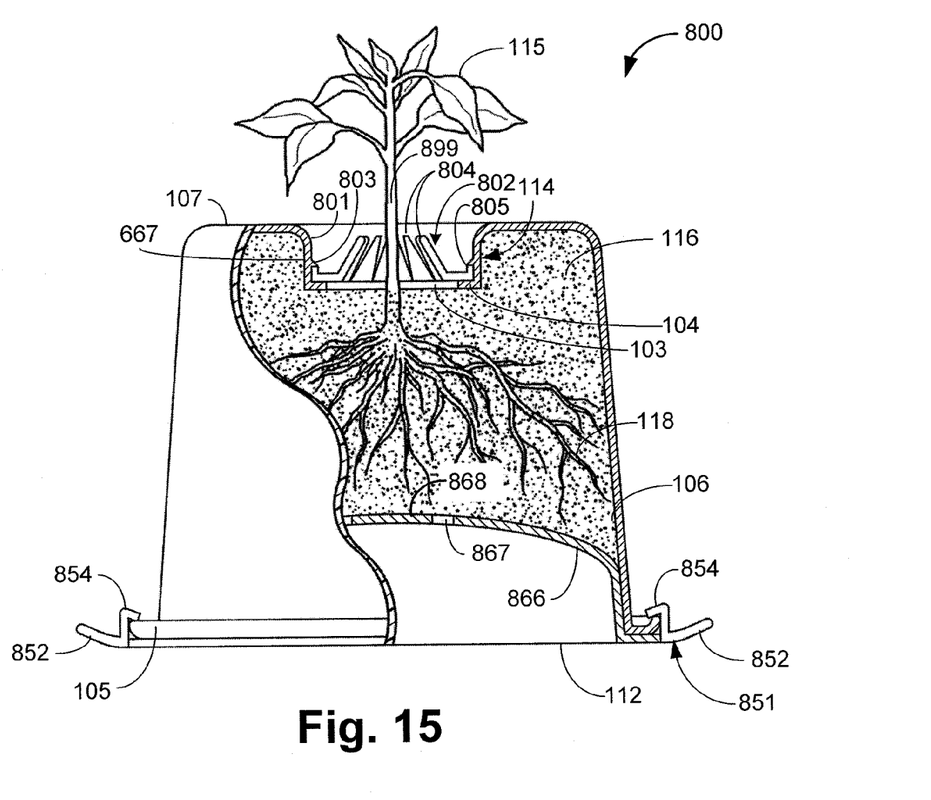
FIG. 15 is a cut-away perspective view of an invertible plant pot according to another exemplary embodiment of the present disclosure in the upright position prior to inversion.

FIG. 15 is a cut-away side perspective view of a plant pot 800 according to an embodiment of the present disclosure. The cover 851 is coupled to the open end 112 of the plant pot 800. The cover 851 comprises one or more cover fasteners 854. In addition, the cover 851 comprises a trough 866 that extends into the soil chamber 106. As will be described further herein, the trough 866 comprises one or more drainage holes 867 that are located near the apex 868 of the trough 866. The drainage holes 867 allow excess water to drain from the soil 116 that is within the soil chamber 106 when the invertible plant pot 800 is in the upright position. The drainage holes 867 further allow water to enter the soil chamber 106 when the invertible plant pot 800 is in the inverted position.

An adjustable cover 802 covers the plant aperture 103 and aids in the retention of soil 116 when the pot 800 is in an inverted position. In other words, the adjustable cover 802 helps to prevent soil 116 from escaping through the aperture 103 by providing an adjustable opening 806 (FIG. 17) through which the plant 115 extends.

In this embodiment, the adjustable cover 802 comprises a plurality of petals 804 that open as required to accommodate the growth of the plant 115. In this regard, the adjustable cover 802 is formed from a flexible material such as plastic and the petals 804 radiate from a central opening 806 (FIG. 17) through which a stem 899 of the plant 115 extends.

The central opening 806 is generally smaller than the plant aperture 103. In this regard, the plant aperture 103 needs to be large enough that the user (not shown) can access the soil 116 and secure the roots 118 of the plant 115 within the soil chamber 106. However, the larger the plant aperture 103, the more soil 116 that may spill out when the plant pot 800 is in its inverted position. Therefore, a purpose of the adjustable cover 802 is to adjustably reduce the size of the aperture 103 to the smaller central opening 806 to reduce soil spillage.

The adjustable cover 802 comprises a lip 805 extending from its outer edge. The adjustable cover 802 is circular in the illustrated embodiment and is sized to fit within an inner wall 801 of the platform 114. The platform 114 comprises sidewalls 667 that are generally cylindrical in the illustrated embodiment and extend between the floor 107 and the platform floor 104. Thus the circular adjustable cover 802 is releasably coupled to the platform 114 and covers the aperture 103. The adjustable cover 802 is frictionally retained by one or more ledges 803 formed in the inner wall 801 of the platform 114. The ledges 803 comprise extensions from the inner wall 801 of the platform 114.

The cover 851 is coupled to the open end 112 of the pot 800. The cover 851 comprises a plurality of fasteners 854 that grasp the lip 105 of the pot 800 and secure the cover 851 to the pot 800. The cover 851 further comprises tabs 852 that assist in securing the cover 851 to the pot 800, as further discussed herein.

Figure 16:
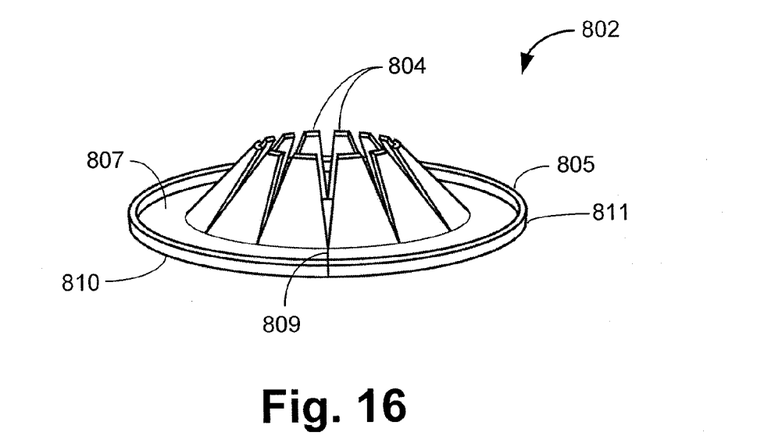
FIG. 16 is a side perspective view of the adjustable cover illustrated in FIG. 15.

FIG. 16 is a side perspective view of the adjustable cover 802 of FIG. 15. The adjustable cover 802 comprises a bottom surface 810 that couples with the platform 114 (FIG. 15) when the adjustable cover 802 is installed on the pot 800 (FIG. 15). The adjustable cover 802 further comprises a base portion 807 from which the petals 804 flexibly extend. The rim 805 extends from the base portion 807 generally perpendicularly from the base portion 807.

The adjustable cover 802 further comprises a slit 809 on one edge of the cover 802. The slit 809 extends from between two adjacent petals 804 to an outside perimeter 811 of the cover in a horizontal direction and extends through the base portion in a vertical direction. The cover 802 is formed from a flexible material and the slit 809 allows the cover 802 to be "opened" for installation around a plant 115 (FIG. 15) without damaging the plant 115.

Figure 17:
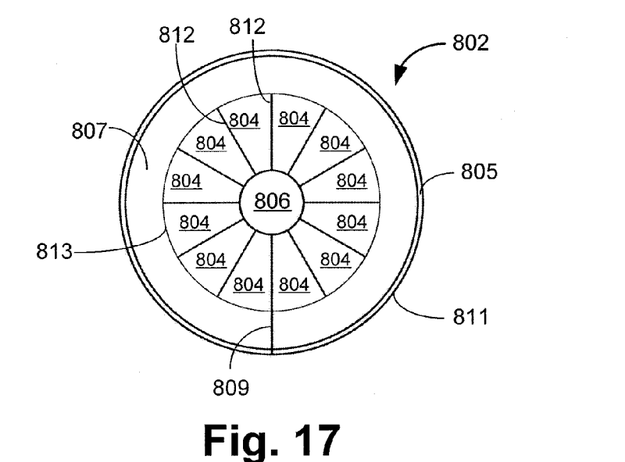
FIG. 17 is a plan view of the adjustable cover of FIG. 16.

FIG. 17 is a top plan view of the adjustable cover 802 of FIG. 15. The cover 802 is formed from a single piece of flexible material in one embodiment. A central opening 806 extends through the cover 802 and the plant 115 (FIG. 15) extends through the opening 806 when the cover 802 is installed on the pot 800 (FIG. 15). The petals 804 are formed by slits 812 that radiate from the central opening 806 to a generally circular petal perimeter 813 disposed between the central opening 806 and the outside perimeter 811 of the cover 802.

Although FIG. 16 shows the petals 804 as extending upwardly at an angle from the cover 802, when the cover 802 is initially formed, the petals 804 lie in the same plane as the base portion 807. Because the cover 802 is formed from a flexible material, the petals 804 may be bent upward to increase the size of the central opening 806 to accommodate growth of the plant 115 (FIG. 15). Further, because the petals 804 are flexible, they will flex automatically when acted upon by a force caused by the stem 899. Thus the central opening 806 will expand as the stem 899 enlarges in diameter sufficiently to contact the petals 804.

Figure 18:
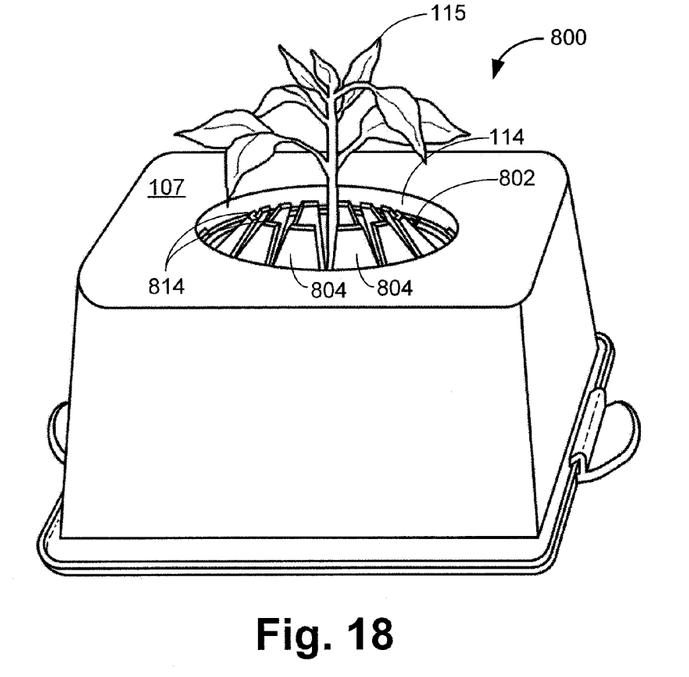
FIG. 18 is a side perspective view of the plant pot of FIG. 15.

FIG. 18 is a side perspective view of the plant pot 800 of FIG. 15, showing the petals 804 extending from the cover 802. When the petals 804 extend angularly from the cover 802 as illustrated, the ends 814 of the petals 804 are disposed (in the vertical direction) between the platform floor 104 (FIG. 15) and the floor 107 of the pot 800.

Figure 19:
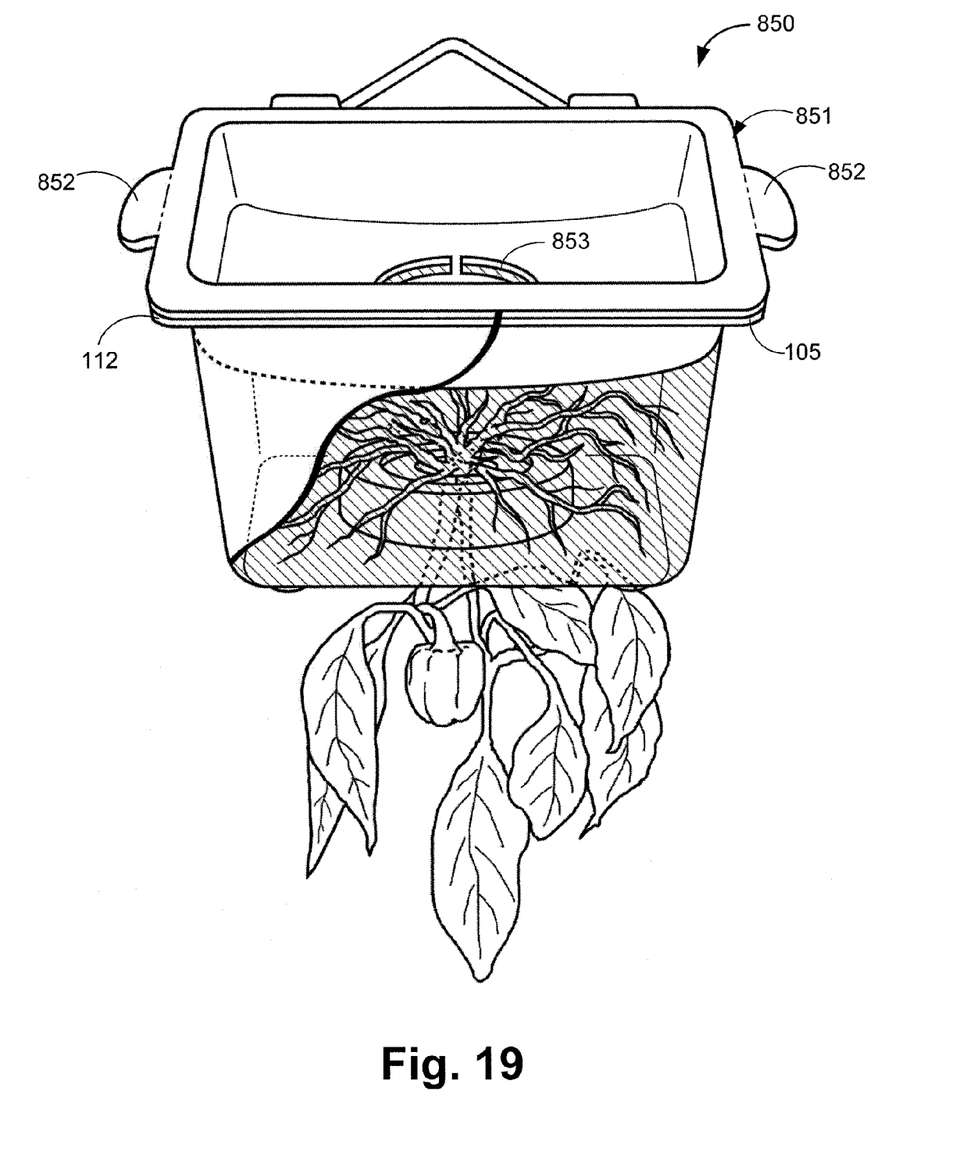
FIG. 19 is a cut-away perspective view of the invertible plant pot of FIG. 15 in the inverted position.

FIG. 19 is an alternative embodiment of the plant pot 800 with an alternative cover 851. The cover 851 is coupled to the open end 112 of the pot 800. Tabs 852 extend from the cover 851 and assist in installing and removing the cover 851, as further discussed below with respect to FIGS. 20 and 21.

Figure 20:
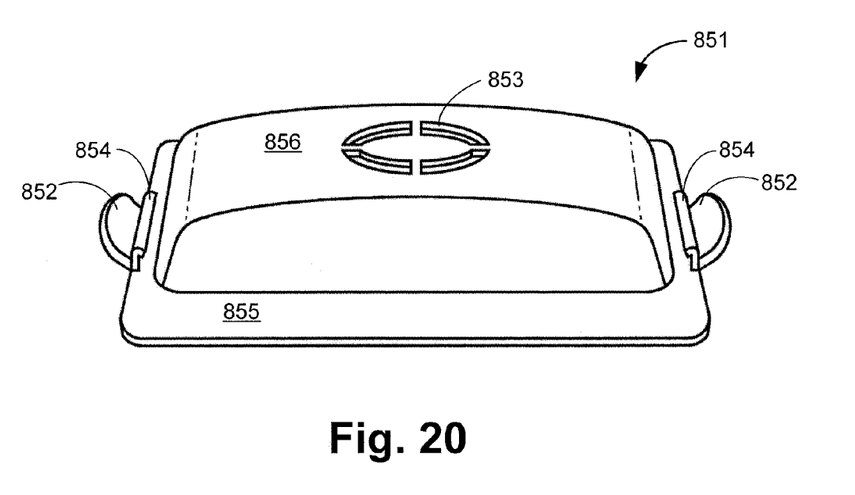
FIG. 20 is a bottom perspective view of a plant pot cover according to an exemplary embodiment of the present disclosure.

FIG. 20 is a bottom perspective view of the cover 851 of FIG. 19. In this embodiment, the cover 851 comprises a plurality of tabs 852 that are affixed to a rim 855 of the cover 851. A plurality of fasteners 854 are affixed to and extend from the rim 855. The fasteners 854 grasp the rim 105 (FIG. 15) of the pot 800 (FIG. 15) to secure the cover 851 to the pot 800.

The tabs 852 aid in installation and removal of the cover 851. In this regard, a user (not shown) pulling upward on the tabs 852 causes the fasteners 854 to decouple from the pot 800.

In this embodiment, the openings 853 on the cover 851 comprise semi-circular slots that extend through the trough 856.

Figure 21:
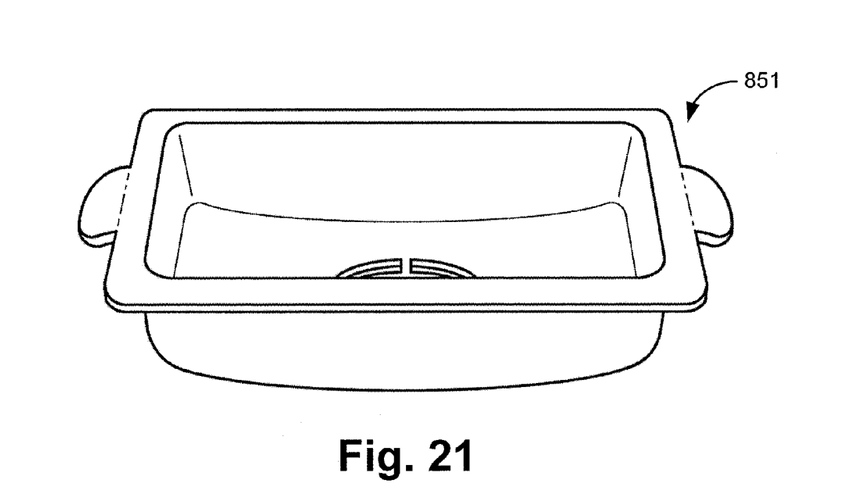
FIG. 21 is a top perspective view of the plant pot cover of FIG. 20.

FIG. 21 is a top perspective view of the cover 851 of FIG. 19.

Figure 22:
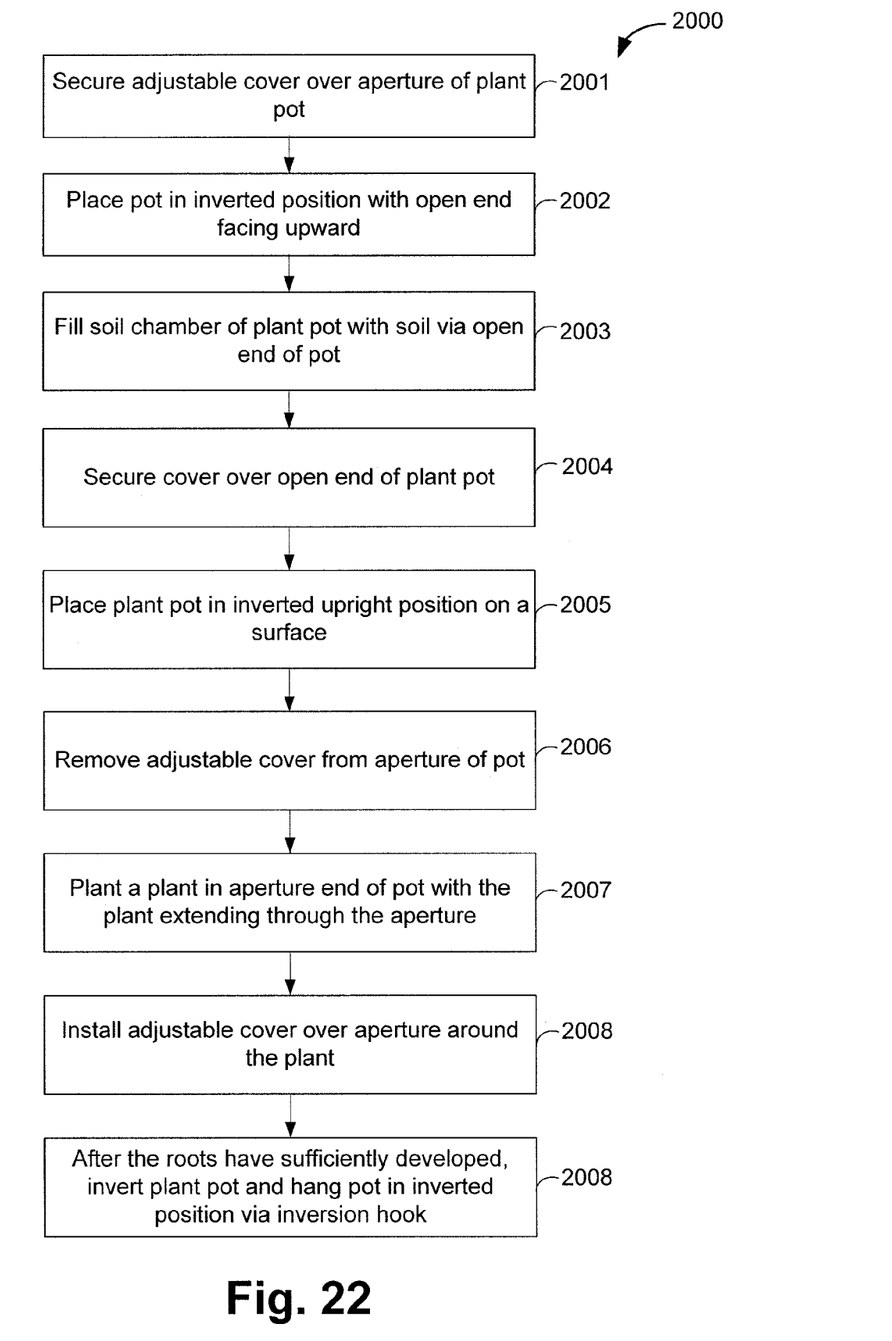
FIG. 22 is a flow chart illustrating a method for growing a plant in a plant pot according to an exemplary embodiment of the present disclosure.

FIG. 22 is a flow chart illustrating a method 2000 for growing a plant using the plant pot 800 (FIG. 15). In step 2001 of the method, a user (not shown) secures the adjustable cover 802 (FIG. 15) over the aperture 103 (FIG. 15). The adjustable cover 802 helps to retain soil 116 (FIG. 15) when the pot 800 is in its inverted orientation.

In step 2002, the user places the pot 800 on a surface (not shown) with the open end 112 facing upward. In step 2003, the user fills the soil chamber 106 (FIG. 15) with soil 116.

In step 2004, the user secures the cover 200 to the open end 112 (FIG. 15) of the pot 800. Then in step 2005, the user inverts the pot 800 and places it on a surface (not shown) in its upright position. In step 2006, the user removes the adjustable cover 802 from the aperture 103 of the pot, and in step 2007, the user plants a plant 115 (FIG. 15) in the pot with the plant extending through the aperture 103.

In step 2008, the user reinstalls the adjustable cover 802 over the aperture 103 such that the plant 115 extends through the central opening 806 (FIG. 17) of the cover 802. The user may then water the plant 115 by pouring water through the adjustable cover 802.

When the plant pot 800 is in its upright position, the plant 115 will grow upwardly toward the sun (not shown) or other light source and the roots will expand downwardly and outwardly in their normal manner. The user should therefore leave the plant pot 800 in the upright position until the roots 118 (FIG. 15) are sufficiently developed, at which time the user may invert the plant pot 800 and hang the pot via the inversion hook 101, as shown in Step 2009. If the user inverts the plant pot 800 before the roots 118 are sufficiently developed, the roots 118 may not expand and fill the pot 800 and the plant's health may suffer. This is because when the pot 800 is in its inverted position, the roots 118 may not expand sufficiently toward the open end 112 of the pot 800.

As described above and shown in the associated drawings, the present invention comprises an invertible plant pot. While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements that embody the spirit and scope of the present invention.

What is claimed is:

1. A plant pot comprising:
    a soil chamber formed by rigid walls and adapted to support a plant in an upright position and an inverted position;
    an open end disposed on a lowermost end of the pot when a plant is in the inverted position;
    an end cover releasably coupled to the open end and adapted to stably support the plant pot and to retain soil within the chamber when a plant is in the upright position;
    a base end opposing the open end, the base end comprising an aperture; and
    an aperture cover releasably coupled to the aperture, the aperture cover comprising an adjustable opening,
    such that a plant planted in the soil chamber has a stem extending through the aperture and through the adjustable opening;
    wherein the base end further comprises a base floor and a platform recessed from the base floor into the soil chamber, the platform comprising a platform floor spaced apart from the base floor and a platform wall extending from the base floor to the platform floor, wherein, and the aperture is centrally disposed through the platform floor.

2. The plant pot of claim 1, wherein the platform wall is substantially cylindrical.

* * * * *